United States Patent
Jeong et al.

(10) Patent No.: US 12,283,433 B2
(45) Date of Patent: *Apr. 22, 2025

(54) MULTILAYERED ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Jae Hoon Jeong, Suwon-si (KR); Hyun Woong Na, Suwon-si (KR); Yun Jeong Cha, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,856

(22) Filed: Mar. 8, 2024

(65) Prior Publication Data

US 2024/0266117 A1    Aug. 8, 2024

Related U.S. Application Data

(63) Continuation of application No. 17/460,893, filed on Aug. 30, 2021, now Pat. No. 11,955,286.

(30) Foreign Application Priority Data

Nov. 19, 2020    (KR) .......................... 10-2020-0155173

(51) Int. Cl.
*H01G 4/30*    (2006.01)
*C04B 35/468*    (2006.01)
(Continued)

(52) U.S. Cl.
CPC ............. *H01G 4/30* (2013.01); *C04B 35/468* (2013.01); *H01G 4/008* (2013.01); *H01G 4/012* (2013.01);
(Continued)

(58) Field of Classification Search
CPC ....................... C04B 35/468; C04B 2235/652; H01G 4/008; H01G 4/012; H01G 4/1218; H01G 4/1227; H01G 4/30
See application file for complete search history.

(56) References Cited

U.S. PATENT DOCUMENTS 10,529,489 B1   1/2020   Kwon et al.
11,955,286 B2 * 4/2024   Jeong ................... C04B 35/468
(Continued)

FOREIGN PATENT DOCUMENTS

JP    H05-190373 A    7/1993
KR    10-2015-0036428 A    4/2015
(Continued)

OTHER PUBLICATIONS

Korean Office Action dated Feb. 11, 2025 issued in Korean Patent Application No. 10-2020-0155173 (with English translation).

*Primary Examiner* — Nathan Milakovich
(74) *Attorney, Agent, or Firm* — Morgan, Lewis & Bockius LLP

(57) ABSTRACT

A multilayer electronic component includes: a body including a dielectric layer, and an internal electrode alternately disposed with the dielectric layer; and an external electrode disposed on the body and connected to the internal electrode. A composite layer containing Sn and Ni is disposed at an interface between the internal electrode and the dielectric layer. The internal electrode includes an interface portion
(Continued)

between the composite layer and a central portion of the internal electrode. The interface portion includes a ceramic additive.

15 Claims, 9 Drawing Sheets

(51) Int. Cl.
    *H01G 4/008*      (2006.01)
    *H01G 4/012*      (2006.01)
    *H01G 4/12*      (2006.01)

(52) U.S. Cl.
    CPC ..... *H01G 4/1218* (2013.01); *C04B 2235/652* (2013.01)

(56) References Cited

U.S. PATENT DOCUMENTS

| | | |
|---|---|---|
| 2015/0155098 A1 | 6/2015 | Yamaguchi et al. |
| 2016/0358713 A1 | 12/2016 | Doi et al. |
| 2017/0011850 A1 | 1/2017 | Kim et al. |
| 2017/0186542 A1 | 6/2017 | Lee et al. |

FOREIGN PATENT DOCUMENTS

| | | |
|---|---|---|
| KR | 10-2016-0143517 A | 12/2016 |
| KR | 10-2017-0005645 A | 1/2017 |
| KR | 10-2017-0077548 A | 7/2017 |
| KR | 10-2019-0121136 A | 10/2019 |

\* cited by examiner

MULTILAYERED ELECTRONIC COMPONENT AND METHOD OF MANUFACTURING THE SAME

CROSS-REFERENCE TO RELATED APPLICATION (S)

This application is a Continuation Patent Application of U.S. patent application Ser. No. 17/460,893, filed on Aug. 30, 2021, which claims priority to and the benefit of Korean Patent Application No. 10-2020-0155173, filed on Nov. 19, 2020, the disclosure of which are incorporated herein by reference in its entirety.

TECHNICAL FIELD

The present disclosure relates to a multilayer electronic component and a method of manufacturing the same.

BACKGROUND

A multilayer ceramic capacitor (MLCC), a type of multilayer electronic component, is a chip type condenser, mounted on the printed circuit boards of various types of electronic products, including image display devices, such as a liquid crystal display (LCD) and a plasma display panel (PDP), a computer, a smartphone, a mobile phone, and the like, serving to charge or discharge electricity.

Such a multilayer ceramic capacitor may be used as a component of various electronic devices due to advantages thereof, such as miniaturization, high capacitance, and ease of mounting. In recent year, as electronic devices such as computers and mobile devices are miniaturized, demand for miniaturization and implementation of high capacitance in a multilayer ceramic capacitor are increasing.

In order to achieve miniaturization and high capacitance in a multilayer ceramic capacitor, a technology in which thicknesses of an internal electrode and a dielectric layer are reduced is required.

However, as the internal electrode and the dielectric layer become thinner, internal electrode connectivity may be deteriorated, and smoothness may decrease, and thus reliability may be deteriorated.

SUMMARY

An aspect of the present disclosure is to improve reliability of a multilayer electronic component.

An aspect of the present disclosure is to improve electrode connectivity of internal electrodes.

An aspect of the present disclosure is to increase smoothness of the internal electrode.

Another aspect of the present disclosure is to provide a multilayer electronic component having high reliability, a small size, and having high capacitance.

However, the object of the present disclosure is not limited to the above description, and will be more easily understood in the course of describing specific embodiments of the present disclosure.

According to an aspect of the present disclosure, a multilayer electronic component may include: a body including a dielectric layer and an internal electrode alternately disposed with the dielectric layer; and an external electrode disposed on the body and connected to the internal electrode. A composite layer containing Sn and Ni may be disposed at an interface between the internal electrode and the dielectric layer, and the internal electrode may include an interface portion between the composite layer and a central portion of the internal electrode. The interface portion may include a ceramic additive.

According to an aspect of the present disclosure, a method of manufacturing a multilayer electronic component includes operations of: preparing a ceramic green sheet; applying a paste for internal electrodes to the ceramic green sheet to form an internal electrode pattern; stacking a ceramic green sheet on which the internal electrode pattern is formed to form a laminate; primarily burning out the laminate; secondarily burning out the primarily burned out laminate; sintering the secondarily burned out laminate to form a body including a dielectric layer and an internal electrode; and forming an external electrode on the body. The paste for the internal electrodes may contain an Sn powder particle, a ceramic additive, and a conductive powder particle. The conductive powder particle may have a core-shell structure. The core contains Ni, and the shell may contain Ni, S, and O.

According to an aspect of the present disclosure, a multilayer electronic component may include: a body including a dielectric layer, and an internal electrode alternately disposed with the dielectric layer; and an external electrode disposed on the body and connected to the internal electrode. The internal electrode may include an interface portion spaced apart from the dielectric layer and including a ceramic additive, the interface portion disposed between the dielectric layer and a center portion of the internal electrode. An area % of the ceramic additive in the interface portion may be greater than an area % of the ceramic additive in the central portion of the internal electrode.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
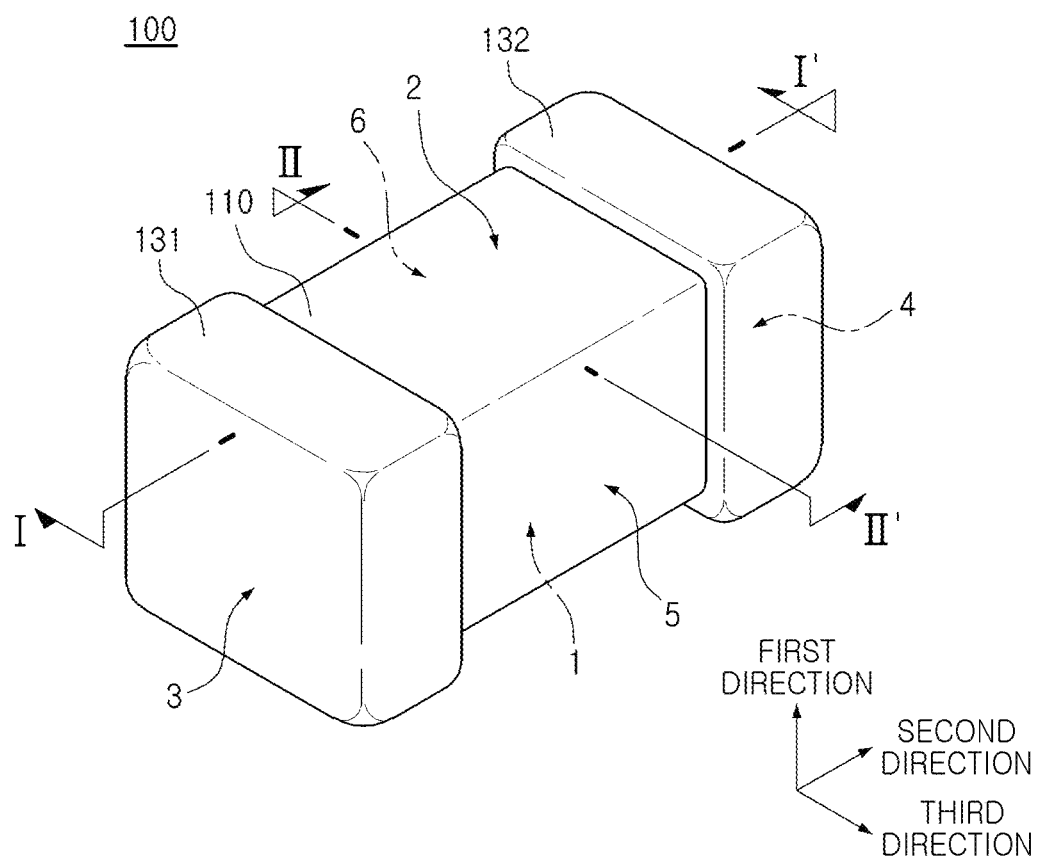
FIG. 1 schematically illustrates a perspective view of a multilayer electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the drawings, a first direction may be defined as a stacking direction or a thickness (T) direction, a second direction may be defined as a length (L) direction, and a third direction may be defined as a width (W) direction.

Multilayer Electronic Component

FIG. 1 schematically illustrates a perspective view of a multilayer electronic component according to an embodiment of the present disclosure.

Figure 2:
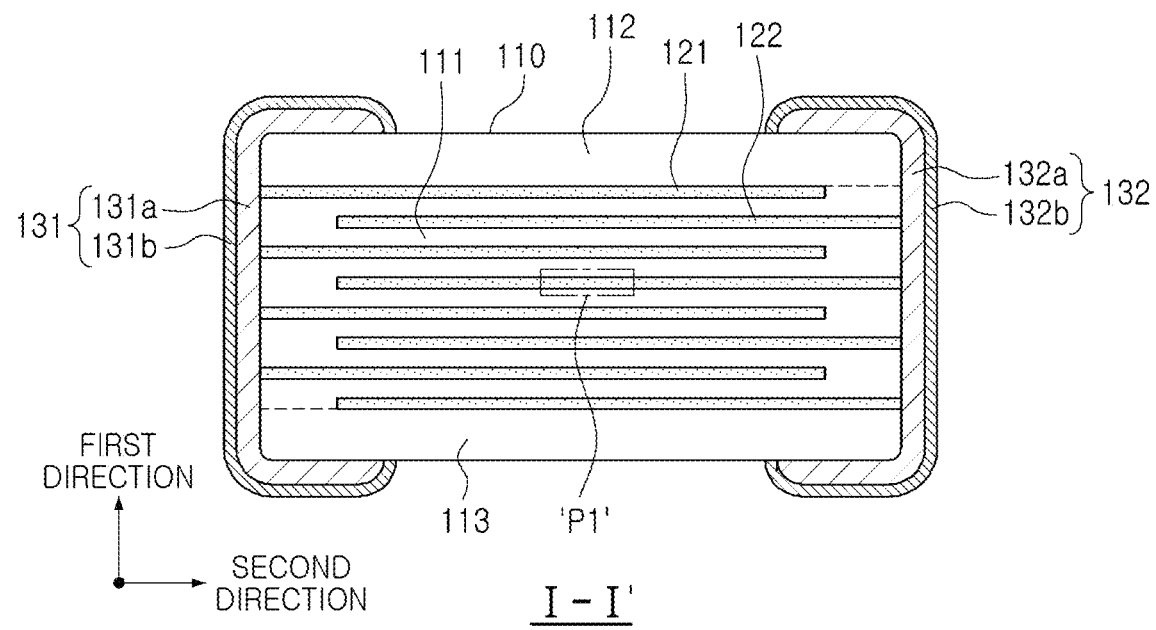
FIG. 2 schematically illustrates a cross-sectional view taken along line I-I' of FIG. 1.

FIG. 2 schematically illustrates a cross-sectional view taken along line I-I' of FIG. 1.

Figure 3:
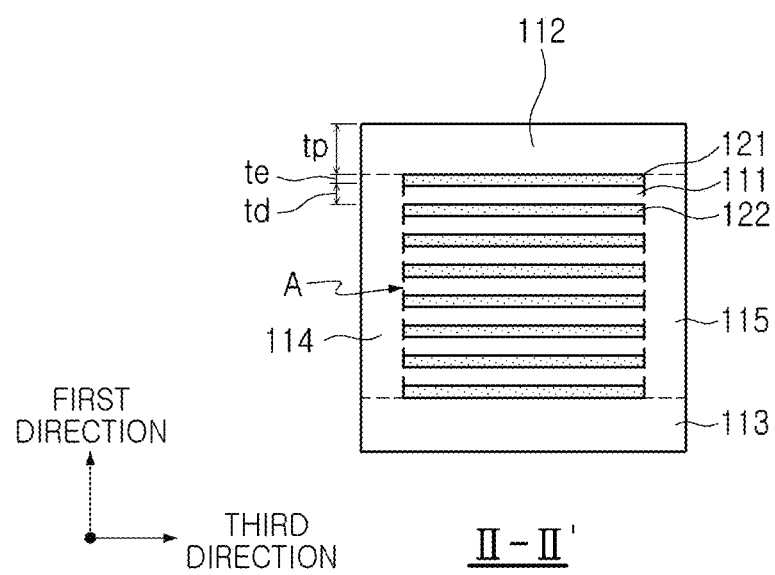
FIG. 3 schematically illustrates a cross-sectional view II-II' of FIG. 1.

FIG. 3 schematically illustrates a cross-sectional view II-II' of FIG. 1.

Figure 4:
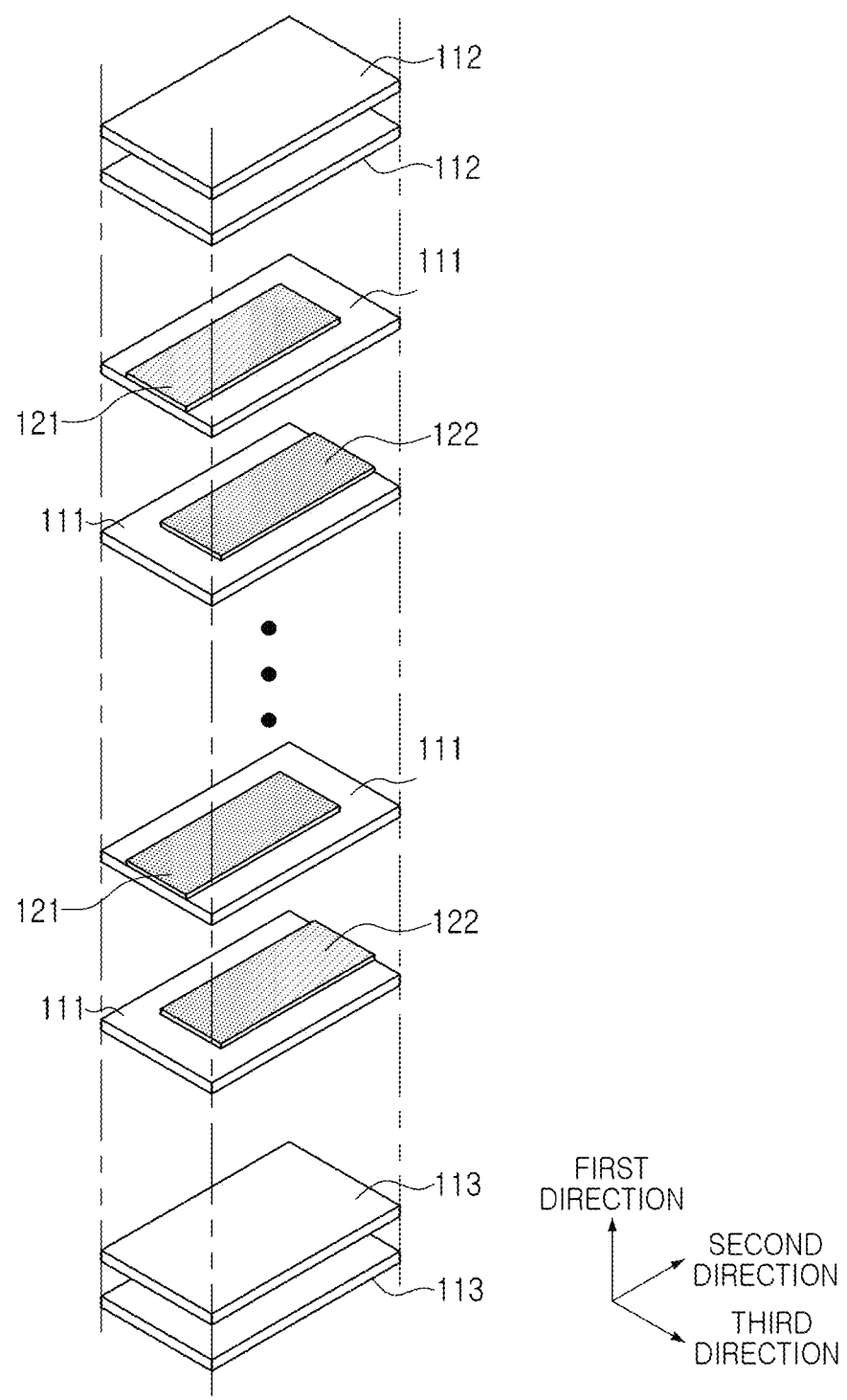
FIG. 4 is an exploded perspective view schematically illustrating a body in which a dielectric layer and an internal electrode are stacked according to an embodiment of the present disclosure.

FIG. 4 is an exploded perspective view schematically illustrating a body in which a dielectric layer and an internal electrode are stacked according to an embodiment of the present disclosure.

Figure 5:
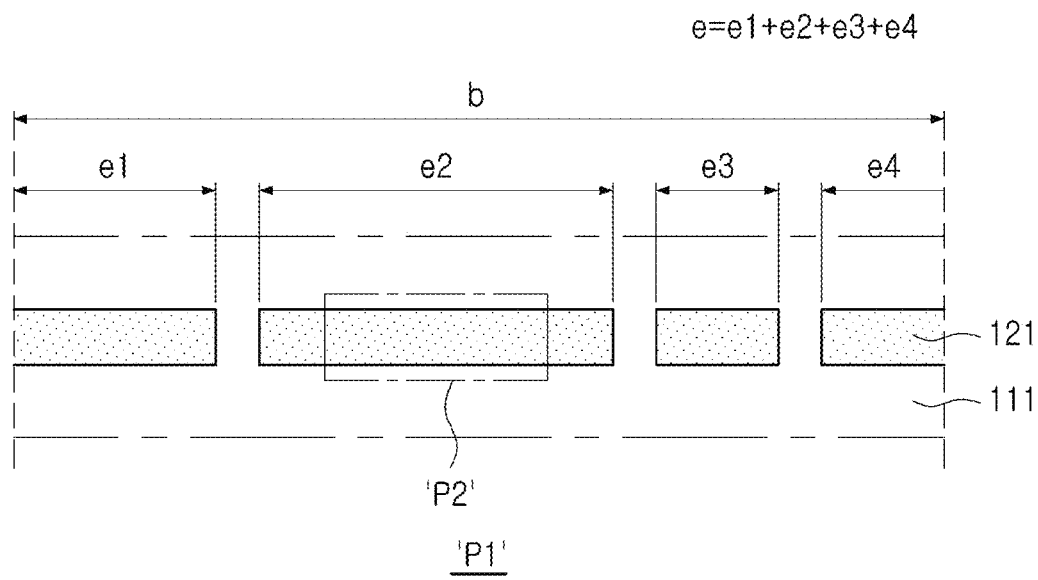
FIG. 5 is a view illustrating an enlarged area P1 of FIG. 2.

FIG. 5 is a view illustrating an enlarged area P1 of FIG. 2.

Figure 6:
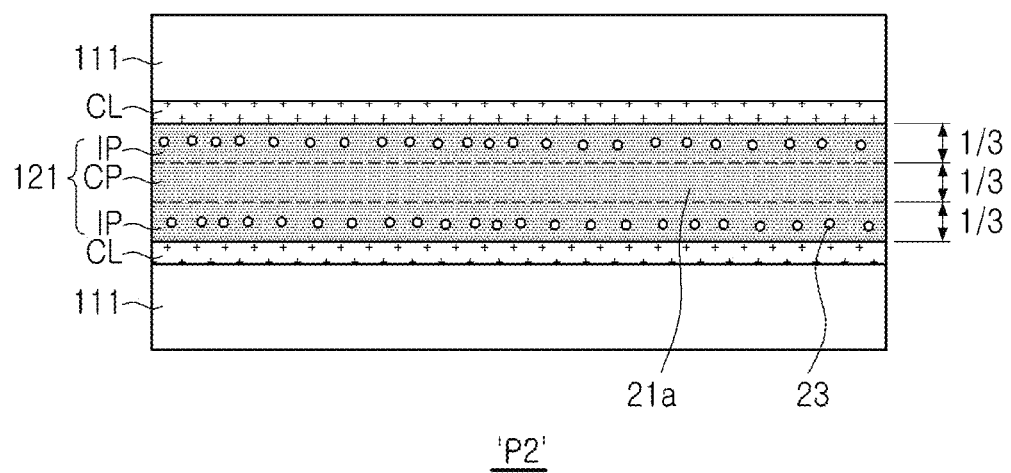
FIG. 6 is a view illustrating an enlarged area P2 of FIG. 5.

FIG. 6 is a view illustrating an enlarged area P2 of FIG. 5.

Hereinafter, a multilayer electronic component according to an embodiment of the present disclosure will be described in detail with reference to FIGS. 1 to 6.

According to an embodiment of the present disclosure, a multilayer electronic component 100 includes a body 110 including a dielectric layer 111, and internal electrodes 121 and 122 alternately disposed with the dielectric layer; and external electrodes 131 and 132 disposed on the body and connected to the internal electrodes, a composite layer (CL) containing Sn and Ni is disposed at an interface with the internal electrode and the dielectric layer, the internal electrodes 121 and 122 include an interface portion IP, adjacent to the composite layer CL, and a central portion CP disposed between the interface portion, and the interface portion IP includes a ceramic additive 23.

The body 110 is formed by alternately stacking a dielectric layer 111 and internal electrodes 121 and 122.

The specific of the 110 shape body is not particularly limited, but as illustrated, the body 110 may have a hexahedral shape, or a shape similar thereto. Due to shrinkage of ceramic powder particle included in the body 110 during a sintering process, the body 110 may have a substantially hexahedral shape, but may not have a hexahedral shape having completely straight lines.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4 and opposing each other in a third direction.

A plurality of dielectric layers 111 forming the body 110 may be in a sintered state, and a boundary between adjacent dielectric layers 111 may be integrated to such an extent that it is difficult to identify the device without using a scanning electron microscope (SEM).

According to an embodiment of the present disclosure, a raw material for forming the dielectric layer 111 is not particularly limited, as long as sufficient capacitance may be obtained therewith. For example, a barium titanate-based material, a lead composite perovskite-based material, a strontium titanate-based material, or the like may be used. The barium titanate-based material may include a $BaTiO_3$-based ceramic powder particle, and examples of the ceramic powder particle may include $BaTiO_3$, or $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, in which calcium (Ca), zirconium (Zr), or the like is partially dissolved into $BaTiO_3$, and the like.

As the material for forming the dielectric layer 111, various ceramic additives, organic solvents, binders, dispersants, or the like may be added to powder particle particles such as barium titanate ($BaTiO_3$) according to the purpose of the present disclosure.

Meanwhile, the thickness td of the dielectric layer 111 is not particularly limited.

However, in general, when the dielectric layer is formed to have a thickness of less than 0.6 μm, in particular, when the thickness of the dielectric layer is 0.41 μm or less, there is a concern that reliability may be deteriorated.

As described below, according to an embodiment of the present disclosure, since it is possible to increase internal electrode connectivity and smoothness while maximizing contraction of the internal electrode in the thickness direction make the internal electrode thinner, reliability can be effectively improved even when the dielectric layer is very thin. Therefore, even when the thickness of the dielectric layer is 0.41 μm or less, sufficient reliability can be secured.

Therefore, when the thickness of the dielectric layer 111 is 0.41 μm or less, an effect of improving reliability according to the present disclosure may be remarkably improved.

The thickness td of the dielectric layer 111 may mean an average thickness of the dielectric layer 111 disposed between the first and second internal electrodes 121 and 122.

The average thickness of the dielectric layer 111 may be measured by scanning an image of a cross-section of the body in length and thickness directions (L-T directions) with a scanning electron microscope (SEM).

For example, for any dielectric layer 111 extracted from an image obtained by scanning the cross-section in the length and thickness directions (L-T direction) cut in the central portion of the body 110 in the width direction, with a scanning electron microscope (SEM), an average value can be measured by measuring the thickness thereof at 30 equally spaced points in the length direction.

The thickness measured at the 30 points having equal intervals may be measured at a capacitance formation portion A, meaning a region in which the internal electrodes 121 and 122 overlap each other.

The body 110 may include a capacitance formation portion A disposed in the body 110, and including a first internal electrode 121 and a second internal electrode 122 disposed to oppose each other with the dielectric layer 111 interposed therebetween and having capacitance formed therein and cover portions 112 and 113 formed in upper and lower portions of the capacitance formation portion A.

In addition, the capacitance formation portion A is a portion serving to contribute to capacitance formation of the capacitor, and may be formed by repeatedly stacking a plurality of first and second internal electrodes 121 and 122 with a dielectric layer 111 interposed therebetween.

The upper cover portion 112 and the lower cover portion 113 may be formed by stacking a single dielectric layer or two or more dielectric layers on the upper and lower surfaces of the capacitance formation portion A in a thickness direction, respectively, and the upper cover portion 112 and the lower cover portion 113 may serve to basically prevent damage to the internal electrodes due to physical or chemical stress.

The upper cover portion 112 and the lower cover portion 113 may not include internal electrodes, and may include the same material as that of the dielectric layer 111.

That is, the upper cover portion 112 and the lower cover position 113 may include a ceramic material, for example, a barium titanate ($BaTiO_3$)-based ceramic material.

Meanwhile, the thickness of the cover portions 112 and 113 need not be particularly limited. However, the thickness tp of the cover portions 112 and 113 may be 20 μm or less in order to more easily achieve miniaturization and high capacitance of the multilayer electronic component.

In addition, margin portions 114 and 115 may be disposed on a side surface of the capacitance formation portion A.

The margin portions 114 and 115 may include a margin portion 114 disposed on the sixth surface 6 of the body 110 and a margin portion 115 disposed on the fifth surface 5 of the body 110. That is, the margin portions 114 and 115 may be disposed on both side surfaces of the body 110 in a width direction.

The margin portions 114 and 115 may mean regions between an interface of both ends of the first and second internal electrodes 121 and 122 and the body 110 in a cross-section of the body 110 cut in a width-thickness (W-T) direction, as shown in FIG. 3.

The margin portions 114 and 115 may basically serve to prevent damage to the internal electrodes due to physical or chemical stress.

The margin portions 114 and 115 may be formed by applying a conductive paste to the ceramic green sheet, except where margin portions are to be formed, to form an internal electrode.

In addition, in order to suppress a step portion of the internal electrodes 121 and 122, after the internal electrodes are cut so as to be exposed to the fifth and sixth surfaces 5 and 6 of the body after lamination, the margin portions 114 and 115 may also be formed by stacking a single dielectric layer or two or more dielectric layers on both side surfaces of the capacitance formation portion A in the width direction.

The internal electrodes 121 and 122 may be alternately disposed with the dielectric layer 111.

The internal electrodes 121 and 122 may include first and second internal electrodes 121 and 122. The first and second internal electrodes 121 and 122 may be alternately disposed to oppose each other with the dielectric layer 111 constituting the body 110 interposed therebetween, and may be exposed to the third and fourth surfaces 3 and 4 of the body 110, respectively.

Referring to FIG. 2, the first internal electrode 121 may be spaced apart from the fourth surface 4 and exposed through the third surface 3, and the second internal electrode 122 may be spaced apart from the third surface 3 and exposed through the fourth surface 4.

In this case, the first and second internal electrodes 121 and 122 may be electrically separated from each other by a dielectric layer 111 disposed in the middle.

Referring to FIG. 4, the body 110 may be formed by alternately stacking a ceramic green sheet on which the first internal electrode 121 is printed and a ceramic green sheet on which the second internal electrode 122 is printed, and then sintering.

Referring to FIG. 6, a composite layer CL containing Sn and Ni may be disposed at an interface between the internal electrodes 121 and 122 and the dielectric layer 111, and the internal electrodes 121 and 122 may include an interface portion IP, adjacent to the composite layer CL, and a central portion CP disposed between the interface portion, and the interface portion IP may include a ceramic additive 23.

As a conventional method for thinning the internal electrodes 121 and 122, there is a method of sintering by thinly printing a conductive paste for forming internal electrodes. However, with this method, since shrinkage occurs in all directions during sintering, there is a concern that an electrode disconnection phenomenon may occur, and there was a problem that the smoothness of the internal electrode is deteriorated.

In the present disclosure, by controlling a shrinkage behavior during sintering, it is possible to improve internal electrode connectivity and smoothness while thinning the internal electrode.

During sintering, shrinkage of 15 to 25% generally occurs in a first direction, a second direction, and a third direction, but in the present disclosure, during sintering, by maximizing contraction of the internal electrode in the first direction (thickness direction), and suppressing the contraction thereof in the second and/or third direction (length and width directions), it is possible to improve internal electrode connectivity and smoothness while thinning the internal electrode.

Figure 7A:
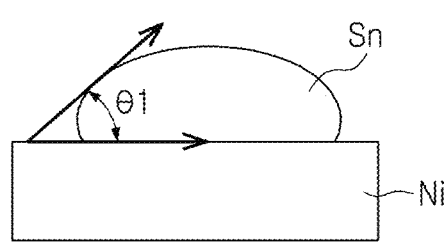
FIG. 7A is a view illustrating wettability of Sn and Ni.
Figure 7B:
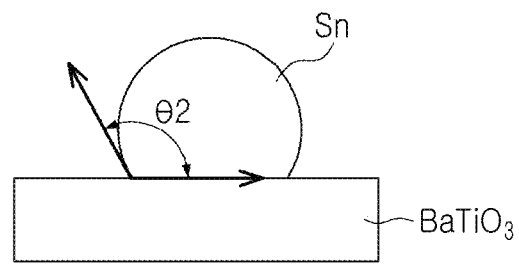
FIG. 7B is a view illustrating wettability of Sn and $BaTiO_3$.

FIG. 7A is a view illustrating wettability of Sn and Ni, and FIG. 7B is a view illustrating wettability of Sn and $BaTiO_3$. Referring to FIGS. 7A and 7B, it can be seen that Sn and Ni have high wettability with a contact angle θ1 of 90 degrees or less, and Sn and $BaTiO_3$ have low wettability with a contact angle θ2 of exceeding 90 degrees. Since the composite layer CL containing Sn and Ni has low wettability with a ceramic additive 23, the ceramic additive 23 may act as a barrier to suppress the movement of the ceramic additive 23 to the dielectric layer 111, and thus the ceramic additive 23 may be trapped in the interface portion IP.

The ceramic additive 23 is trapped in the interface portion IP to suppress sintering shrinkage in a transverse direction, and the central portion CP is constrained by the interface portion IP to cause intensive contraction in a thickness direction. Accordingly, it is possible to improve internal electrode and connectivity smoothness while thinning the internal electrode.

In an embodiment, the interface portion IP may be a region from the interface between the composite layer CL and the internal electrodes 121 and 122 to a depth of ⅓ of the thickness of the internal electrode.

That is, when the internal electrode is divided into three portions in a first direction, it may have a form in which the central portion CP is disposed between the interface portions IP.

Meanwhile, the interface portion IP may include 5 to 15 area % of the ceramic additive 23.

When the ceramic additive 23 is less than 5 area % at the interface portion IP, the effect of suppressing sintering shrinkage in the transverse direction by the ceramic additive 23 may be insufficient, and when the ceramic additive exceeds 15 area %, the ceramic additive content is too high, which may be rather disadvantageous for thinning of the internal electrode.

For any five arbitrary internal electrodes extracted from an image obtained by scanning the cross-section in first and second directions (length and thickness directions) cut in a central portion of the body 110 in the third direction (width direction), with a scanning electron microscope (SEM), the area % of the ceramic additive included in the interface portion IP may be calculated an average value by measuring an area occupied by the ceramic additive in a region up to ⅓ of the thickness of the internal electrode.

Some ceramic additives may also be included in the central portion CP, but less ceramic additives than the interface portion IP may be included. In one example, an area occupied by the ceramic additives in one unit area of the central portion CP may be less than an area occupied by the ceramic additives in one unit area of the interface portion IP. Alternatively, the ceramic additive may not be included in the central portion CP.

For a specific example, the area % of the ceramic additive in the central portion CP may be ½ or less of the area % of the ceramic additive 23 in the interface portion IP. In addition, the area % of the ceramic additive in the central portion CP may be less than 5 area %.

In an embodiment, the Sn concentration of the composite layer CL may be 5 times or more the Sn concentration of the central portion CP.

This is because when the Sn concentration of the composite layer CL is less than 5 times the Sn concentration of the central portion CP, the effect in which the ceramic additive 23 is trapped in the interface portion IP may be insufficient.

For example, for arbitrary five internal electrodes extracted from an image obtained by scanning the cross-section in the first and second directions (length and thickness directions) cut in the central portion of the body 110 in the third direction (width direction), with a scanning electron microscope (SEM), an energy disperse X-ray spectrometer (EDS) line scan analysis may be performed along the thickness direction of the internal electrode, the Sn concentration in the center in the thickness direction and the Sn concentration of the composite layer CL may be measured, and an average value may be measured.

In one embodiment, the composite layer CL may include Sn and Ni in a form of $Ni_3Sn$.

$Ni_3Sn$ included in the composite layer CL can be confirmed by analyzing an interface between the internal electrodes 121 and 122 and the dielectric layer 111 by a selected area difference pattern (SAD) analysis.

In one embodiment, the ceramic additive 23 included in the interface portion IP may be $BaTiO_3$.

Since $BaTiO_3$ has high wettability with Sn, this is because that an effect of suppressing that the ceramic additive 23 by the composite layer CL including Ni and Sn moves to the dielectric layer 111 may be more remarkably improved.

In an embodiment, the internal electrodes 121 and 122 may contain Ni as a main component. Sn contained in the internal electrodes 121 and 122 is liquefied at 232° C. or higher, and moves to the interface portion to form a Ni—Sn intermetallic compound. In addition, the internal electrodes 121 and 122 may include Ni as a main component, and may include one or more of copper (Cu), palladium (Pd), silver (Ag), gold (Au), platinum (Pt), tin (Sn), tungsten (W), titanium (Ti), and alloys thereof.

In one embodiment, a thickness of the composite layer CL may be 10 to 30 nm.

When the thickness of the composite layer CL is less than 10 nm, a role as a barrier may be insufficient. When the thickness thereof exceeds 30 nm, there is concern that delamination defects due to premature sintering shrinkage may occur.

Meanwhile, a thickness te of the internal electrodes 121 and 122 does not need to be particularly limited.

However, in general, when the internal electrodes 121 and 122 are formed to have a thickness of less than 0.6 μm, in particular, when the thickness of the internal electrodes 121 and 122 is 0.41 μm or less, there is a concern that internal electrode connectivity and smoothness are deteriorated.

As described above, according to an embodiment of the present disclosure, since it is possible to increase internal electrode connectivity and smoothness while maximizing contraction of the internal electrode in the thickness direction to make the internal electrode thin, even when the thickness of the internal electrodes 121 and 122 is 0.41 μm, excellent internal electrode connectivity and smoothness can be secured.

Accordingly, when the thickness of the internal electrodes 121 and 122 is 0.41 μm or less, the effect according to the present disclosure can be more remarkably improved, and miniaturization and high capacitance of the capacitor component can be more easily achieved.

The thickness te of the internal electrodes 121 and 122 may mean an average thickness of the internal electrodes 121 and 122.

The average thickness of the internal electrodes 121 and 122 can be measured by scanning an image of a cross-section of the body in the length and thickness direction (a second direction–a first direction) with a scanning electron microscope (SEM).

For example, for arbitrary internal electrodes 121 and 122 extracted from an image scanned with a scanning electron microscope (SEM) of a cross-section of the body 110 in the length and thickness direction (second direction-first direction) cut from the central portion in the width direction, an average value can be measured by measuring the thickness at 30 equally spaced points in the length direction.

In one embodiment, the internal electrodes 121 and 122 may have internal electrode connectivity of 85% or more.

The internal electrode connectivity may be defined as a ratio of the length of a portion in which the internal electrode is actually formed to a total length of the internal electrode.

For example, length of a total electrode measured at any one point of the internal electrode 121 is defined as b and a length of a portion in which the actual electrode is formed as e1, e2, e3, and e4, respectively, internal electrode connectivity can be expressed as e/b, which is a value obtained by dividing the sum of the lengths (e=e1+e2+e3+e4) of the actual electrodes formed by the total electrode length (b).

When the internal electrode connectivity is less than 85%, it may be difficult to secure sufficient capacitance.

According to an embodiment of the present disclosure, since the internal electrode can be thinned by maximizing contraction of the internal electrode in the thickness direction, the internal electrode connectivity can be improved, so that the internal electrode connectivity can be secured to 85% or more.

There is no need to specifically limit an upper limit of the internal electrode connectivity, but considering a manufacturing process or the like, the upper limit thereof may be 97%.

External electrodes 131 and 132 are disposed on the body 110 and are connected to the internal electrodes 121 and 122.

As shown in FIG. 2, the external electrodes 131 and 132 may be disposed on the third and fourth surfaces 3 and 4 of the body 110, respectively, and may include first and second external electrodes 131 and 132 connected to the first and second internal electrodes 121 and 122, respectively.

In the present embodiment, a structure in which the multilayer electronic component 100 two external electrodes 131 and 132 is described, but the number or shape of the external electrodes 131 and 132 may be changed depending on the shape or any other purposes of the internal electrodes 121 and 122.

Meanwhile, the external electrodes 131 and 132 may be formed using any material as long as they have electrical conductivity such as metal, or the like, and a specific material may be determined in consideration of electrical characteristics and structural stability, and further, may have a multilayer structure.

For example, the external electrodes 131 and 132 may include electrode layers 131a and 132a disposed on the body 110 and plating layers 131b and 132b formed on the electrode layers 131a and 132a.

For a more specific example of the electrode layers 131a and 132a, the electrode layers 131a and 132a may be fired electrodes including conductive metal and glass, or resin-based electrodes including conductive metal and a resin.

In addition, the electrode layers 131a and 132a may have a form in which a fired electrode and a resin-based electrode are sequentially formed on a body. In addition, the electrode layers 131a and 132a may be formed by transferring a sheet including conductive metal onto a body, or by transferring a sheet including conductive metal onto a sintered electrode.

A material having excellent electrical conductivity may be used as a conductive metal included in the electrode layers 131a and 132a, and the material is not particularly limited. For example, the conductive metal may be one or more of nickel (Ni), copper (Cu), and alloys thereof.

Plating layers 131b and 132b serve to improve mounting characteristics. The type of the plating layers 131b and 132b is not particularly limited, and may be plating layers including one or more of Ni, Sn, Pd, and alloys thereof, and may be formed of a plurality of layers.

For a more specific example of the plating layers 131b and 132b, the plating layers 131b and 132b may be Ni plating layers or Sn plating layers, and may have a form in which Ni plating layers and Sn plating layers are sequentially formed on the electrode layers 131a and 132a, and Sn plating layers, and Ni plating layers and Sn plating layers are sequentially formed. In addition, the plating layers 131b and 132b may also include a plurality of Ni plating layers and/or a plurality of Sn plating layers.

A size of the multilayer electronic component 100 needs not be particularly limited.

However, in order to achieve miniaturization and high capacitance at the same time, since it is necessary to increase the number of stacked layers by reducing the thickness of the dielectric layer and the internal electrode, in the multilayer electronic component 100 having a size of 0402 (a length×a width, 0.4 mm×0.2 mm) or less, the reliability improvement effect according to the present disclosure may be more remarkably improved.

Accordingly, when a length of the multilayer electronic component 100 is 0.44 mm or less and a width is 0.22 mm or less, considering manufacturing errors and sizes of external electrodes, and the like, a reliability improvement effect according to the present disclosure may be more remarkably improved. Here, the length of the multilayer electronic component 100 may refer to a size of the multilayer electronic component in the second direction, and the width of the multilayer electronic component 100 may refer to a size of the multilayer electronic component 100 in the third direction.

Method of Manufacturing a Multilayer Electronic Component

FIGS. 8 to 11 are views illustrating a method of manufacturing a multilayer electronic component according to another embodiment of the present disclosure.

Hereinafter, a method of manufacturing a multilayer electronic component according to another embodiment of the present disclosure will be described with reference to FIGS. 8 to 11.

According to another aspect of the present disclosure, a method of manufacturing a multilayer electronic component includes operations of: preparing a ceramic green sheet; applying a paste for internal electrodes on the ceramic green sheet to form an internal electrode pattern; stacking a ceramic green sheet on which the internal electrode pattern is formed to form a laminate; primarily burning out the laminate; secondarily burning out the primarily burned out laminate; sintering the secondarily burned out laminate to form a body including a dielectric layer and an internal electrode; and forming an external electrode on the body. The paste for the internal electrode includes Sn powder particle 22, a ceramic additive 23, and conductive powder particle 21, and the conductive powder particle has a core (21a)-shell (21b) structure, and the core (21a) contains Ni, and the shell 21b contains Ni, S, and O.

Operation of Preparing a Ceramic Green Sheet

First, a ceramic green sheet for forming a dielectric layer 111 is prepared.

The ceramic green sheet is for forming the dielectric layer 111 of the body 110, and a slurry may be prepared by mixing the ceramic powder particle 11, a polymer, and a solvent. The ceramic green sheet may be formed by manufacturing the slurry in a sheet shape having a predetermined thickness by a doctor blade method.

Operation of Forming an Internal Electrode Pattern

Thereafter, an internal electrode is formed on at least one surface of each of the ceramic green sheets by printing a conductive paste for internal electrodes to a predetermined thickness. As a printing method of the conductive paste for internal electrodes, a screen-printing method or a gravure printing method may be used.

The paste for internal electrodes may include Sn powder particle, a ceramic additive, and conductive powder particle, the conductive powder particle has a core-shell structure, the core may contain Ni, and the shell may contain Ni, S, and O. As the internal electrode is formed using the paste for internal electrodes, shrinkage of the internal electrode during sintering in a first direction (thickness direction) may be maximized, and shrinkage of the internal electrode in second and third directions (length and width directions) may be suppressed, such that internal electrode connectivity and smoothness may be improved while making the internal electrode thin. In addition, it is possible to more easily implement the internal electrode structure of the multilayer electronic component according to the embodiment of the present disclosure described above.

Figure 8:
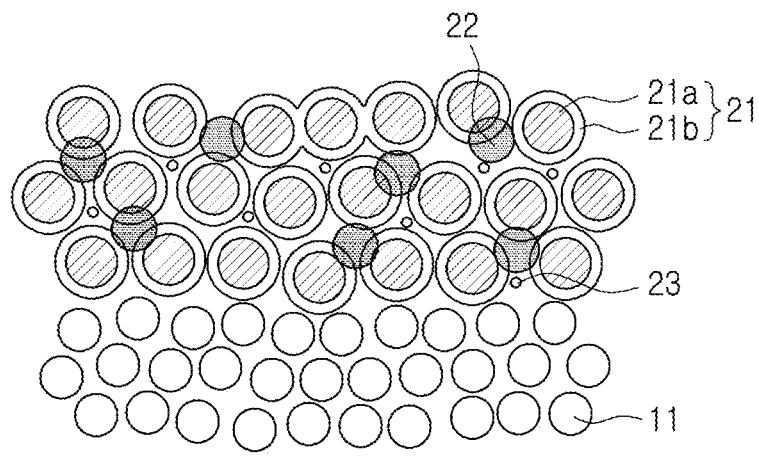
FIGS. 8 to 11 are views illustrating a method of manufacturing a multilayer electronic component according to another embodiment of the present disclosure.

FIG. 8 illustrates that a conductive paste for internal electrodes including Sn powder particle 22, a ceramic additive 23, and conductive powder particle 21 is printed on a ceramic green sheet including ceramic powder particle 11. The conductive powder particle 21 has a core 21a-shell 21b structure, the core 21a contains Ni, and the shell 21b contains Ni, S, and O.

Ni, S, and O contained in the shell 21b may serve to delay the shrinkage of Ni at low temperatures.

When the shell has a Ni—O structure that does not contain S, it is difficult to delay the shrinkage of Ni as the surface O reacts with C to generate CO, $CO_2$, or the like at the beginning of the secondary burn out.

On the other hand, according to the present disclosure, when the shell 21b contains Ni, S and O, S and O are strongly bonded to allow preservation of an oxide film at the beginning of the secondary burn out, thereby delaying the shrinkage of Ni. In addition, by delaying necking between the Ni particles 21a, the ceramic additive 23 may serve to provide a path through which the ceramic additive 23 can move to the interface portion of the internal electrode.

In an embodiment, the conductive powder particle may have an average size of less than 100 nm, and the dielectric additive may have an average size of 5 nm to 10 nm.

In order to form an internal electrode thin, it is advantageous to use fine-grained conductive powder particle. In the case of general fine-grained conductive powder particle, the sintering shrinkage initiation temperature may move to a lower temperature, and the difference between the sintering initiation temperature of the general fine-grained conductive powder particle, as compared to the dielectric layer, may increase, so that defects such as delamination may occur.

However, Ni, S, and O contained in the shell 21b of the conductive powder particle 21 according to the present disclosure may serve to delay the shrinkage of Ni at low temperatures, so even when a fine powder particle of less than 100 nm is used, defects such as delamination can be suppressed.

In one embodiment, in the core-shell structure, the shell 21b may contain 1000 to 2000 ppm of S.

As the conductive powder particle becomes finer, a higher content of S is required to obtain a sufficient shrinkage delay effect. In conductive powder particle having an average particle diameter of 100 nm or less, the shrinkage delay effect may be sufficient when 1000 ppm or more of S is coated, and if S exceeds 2000 ppm, there may be no significant difference in the shrinkage delay effect.

In one embodiment, Ni—O may be disposed on the surface of the shell 21b. When the nano-sized metal powder particle is exposed to an atmosphere, an exothermic reaction occurs by reacting with oxygen, and Ni—O may be disposed on the surface of the shell 21b to prevent the occurrence thereof.

In one embodiment, the Sn powder particle 22 may be 0.3 to 1.0 wt % as compared to 100 wt % of the conductive powder particle 21. If the Sn powder particle 22 is less than 0.3 wt %, it may be insufficient to form the composite layer CL to 10 nm or more, and if it exceeds 1.0 wt %, the composite layer CL may be excessively formed to 30 nm or more. Acceleration of sintering shrinkage may cause delamination defects.

In one embodiment, the ceramic additive 23 may be 5 to 20 wt % compared to 100 wt % of the conductive powder particle 21. When a conductive powder particle with an average particle diameter of 100 nm or less is used as a main material of the internal electrodes 121 and 122, an additive of 5 wt % or more is required, as compared to 100 wt % of the conductive powder particle, and as an average particle diameter decreases, a higher content of ceramic additives is required to suppress sintering shrinkage. When a ratio of the ceramic additive exceeds 20 wt % compared to 100 wt % of the conductive powder particle, it may be disadvantageous for thinning the internal electrode.

In one embodiment, the ceramic additive 23 may be $BaTiO_3$.

Since $BaTiO_3$ has high wettability with Sn, an effect of suppressing the movement of the ceramic additive 23 to the ceramic green sheet by the composite layer CL containing Ni and Sn can be more remarkable.

Operation of Forming a Laminate

A laminate is formed by stacking a ceramic green sheet on which an internal electrode pattern is formed. The laminate may be pressed and pressurized in a stacking direction (first direction).

In this case, the stacked body may be cut into a chip by cutting each region corresponding to the body of one multilayer electronic component. In addition, one end of the internal electrode pattern may be cut to be alternately exposed through both end surfaces in the second direction.

Primary Burn Out Operation

Thereafter, an operation of primarily burning out the laminate may be performed.

Figure 9:
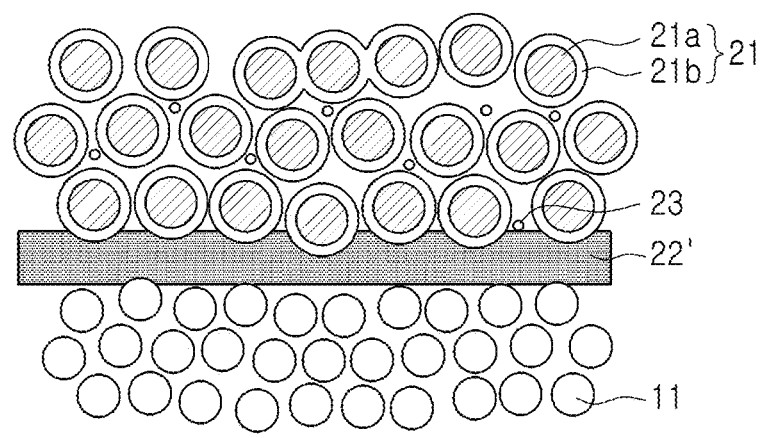

Referring to FIG. 9, in the primary burn out operation, Sn powder particle 22 having a low melting point moves to an interface with the ceramic sheet in a liquid form, and since Sn has low wettability with the ceramic powder particle 11, Sn is disposed in a layer shape 22' at the interface.

In one embodiment, the primarily burning out operation may be performed at a temperature of 250 to 350° C. and in a heavy reduction atmosphere. Sn powder particles may have liquid form within the above temperature range, and since Sn has high oxidation reactivity, oxidation of Sn can be prevented by a heat treatment in a heavy reduction atmosphere.

In this case, the heavy reduction atmosphere for preventing the oxidation of Sn may be a gas atmosphere in which nitrogen ($N_2$) gas and 0.2 to 1.0 vol. % of hydrogen ($H_2$) gas are mixed.

Secondary Burn Out Operation

Thereafter, an operation of secondarily burning out the primarily burned out laminate may be performed.

When the shell 21b of the conductive powder particle 21 contains Ni, S, and O, since S and O are strongly bonded, the shrinkage of Ni can be delayed as the oxide film can be preserved in the initial stage of secondary burn out. In addition, by delaying necking between the Ni particles 21a, the ceramic additive 23 may serve to provide a path through which the ceramic additive 23 can move to the interface portion of the internal electrode.

Figure 10:
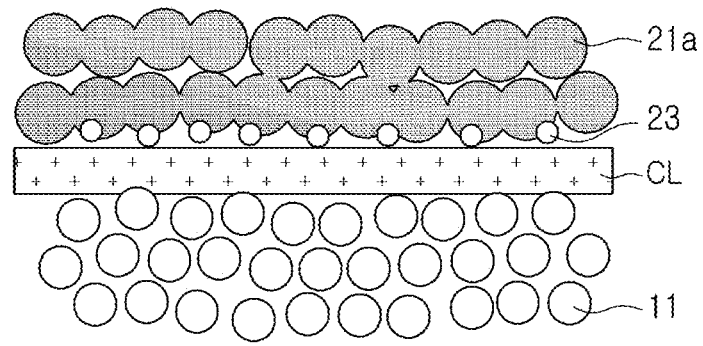

FIG. 10 is a schematic view illustrating a state in which secondary burn out is completed. Referring to FIG. 10, at an interface with the ceramic sheet, the Sn layer and the Ni particles react to form a composite layer CL containing Sn and Ni, and the ceramic additive 23 moves to an interface with the composite layer CL. Since the composite layer CL containing Sn and Ni has low wettability with the ceramic additive, the ceramic additive 23 cannot be prevented from moving toward the ceramic green sheet, but acts as a barrier to prevent the ceramic additive 23 from being trapped at the interface.

In one embodiment, the operation of secondarily burning out may be performed at 600 to 900° C. In the above temperature range, formation of the composite layer CL including Sn and Ni and movement of the ceramic additive 23 may be facilitated.

Sintering Operation

Thereafter, the secondarily burned out laminate may be sintered to form a body including a dielectric layer and an internal electrode.

Figure 11:
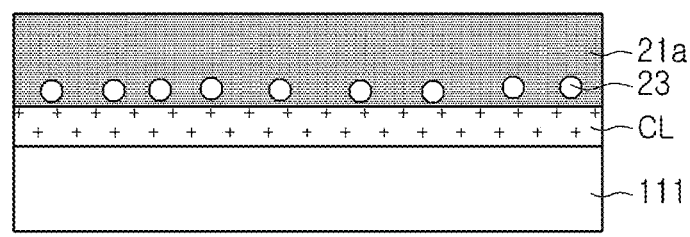

Referring to FIG. 11, a ceramic additive 23 is trapped in the interface portion IP to suppress sintering shrinkage in a transverse direction, and the central portion CP is constrained by the interface portion IP to cause intensive contraction in the thickness direction. Accordingly, it is possible to improve internal electrode connectivity and smoothness while thinning the internal electrode. In addition, the ceramic powder particle 11 is sintered to form a dielectric layer 111.

In an embodiment, a sintering process may be performed in a reducing atmosphere. In addition, the sintering process may be performed by adjusting a temperature increase rate, but is not limited thereto, and the temperature increase rate may be 30° C./60 s to 50° C./60 s at 700° C. or lower, and a sintering temperature may be 900 to 1300° C.

Operation of Forming an External Electrode

Thereafter, an operation of forming an external electrode on the body may be performed.

In this case, exposed portions of the first and second internal electrodes 121 and 122 exposed to both end surfaces of the body in the second direction may be covered to form first and second external electrodes 131 and 132 to be electrically connected to the first and second internal electrodes.

In addition, the surfaces of the first and second external electrodes 131 and 132 may be plated with nickel, tin, or palladium, if necessary.

EXAMPLE

After forming a laminate by stacking a ceramic green sheet on which a conductive paste for internal electrodes is printed, a primary burning out operation, a secondary burning out operation and a sintering operation were performed and an external electrode was formed to prepare sample chips of Inventive examples and Comparative examples. In the Inventive examples and Comparative examples, other conditions, except for the conductive paste for internal electrodes were applied in the same manner.

In the Comparative example, a conductive paste for internal electrodes including a Ni powder particle having an average size of 60 nm and $BaTiO_3$ powder particle having an average size of 10 nm as a ceramic additive was used.

In the Inventive examples, a conductive paste for internal electrodes including a conductive powder particle having a core-shell structure, the shell including Ni, and the shell including Ni, S, and O, a ceramic additive, and a Sn powder particle, were used. An average size of the conductive powder particle was 60 nm, an average size of the ceramic additive was 10 nm, and an average size of the Sn powder particle was 60 nm, and 1 wt % of the Sn powder particle was added compared to 100 wt % of the conductive powder particle. In addition, the ceramic additive was $BaTiO_3$.

Figure 12:
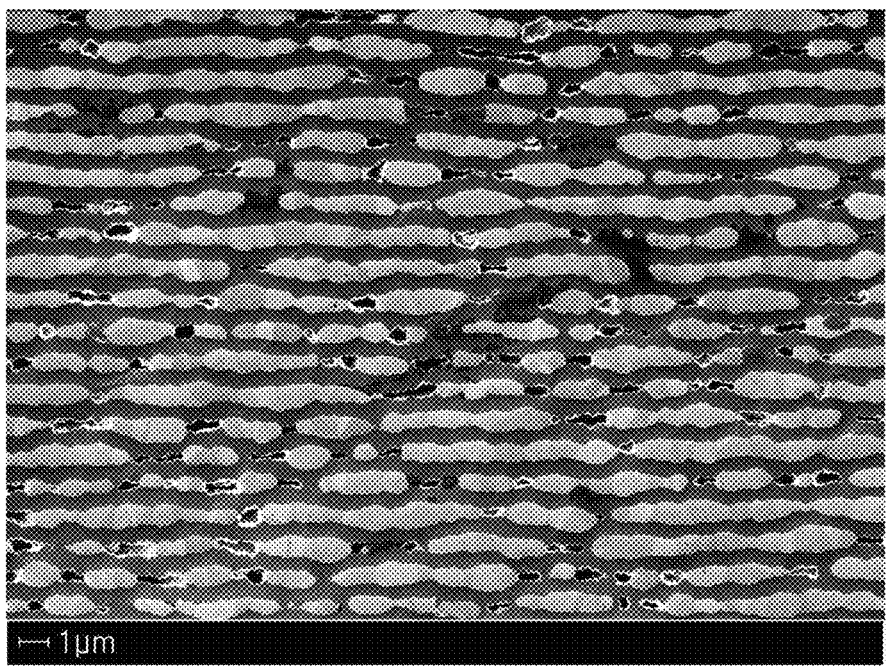
FIG. 12 is a view illustrating a cross section of a Comparative example in which an image is scanned with a scanning electron microscope (SEM)
Figure 13:
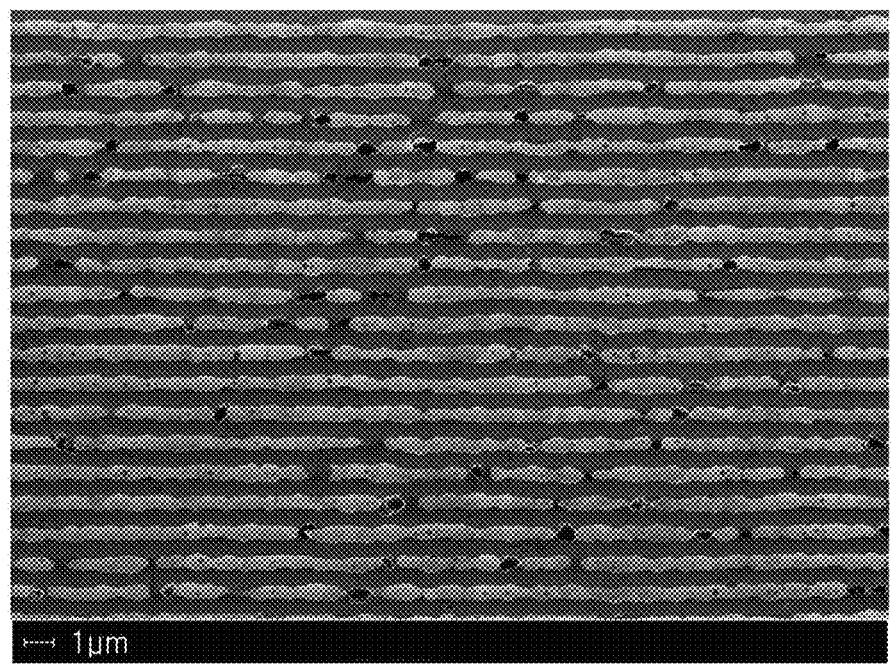
FIG. 13 is a view illustrating a cross-section of an Example of the invention in which an image is scanned with a scanning electron microscope (SEM)

Comparing FIG. 12 (Comparative Example) with FIG. 13 (Inventive Example) in which an image of a cross-section of the sample chip cut in first and second directions from the center of the sample chip is scanned with a scanning electron microscope (SEM), in the case of Inventive example, it can be seen that the smoothness of the internal electrode was significantly improved, as compared to the Comparative example.

In addition, in the cross-sectional image, a length of a portion in which actual internal electrodes are formed was measured with respect to a total length of all internal electrodes, and electrode connectivity to each internal electrode was obtained, and then an average value was obtained. It was confirmed that the internal electrode connectivity was 93% in the Inventive example, and in the Comparative example, the internal electrode connectivity was 84%, in which it was confirmed that the internal electrode connectivity was improved by 9%.

In addition, the average thickness of the internal electrodes of the Inventive examples was reduced by 5.8% as compared to the Comparative examples.

Figure 14:
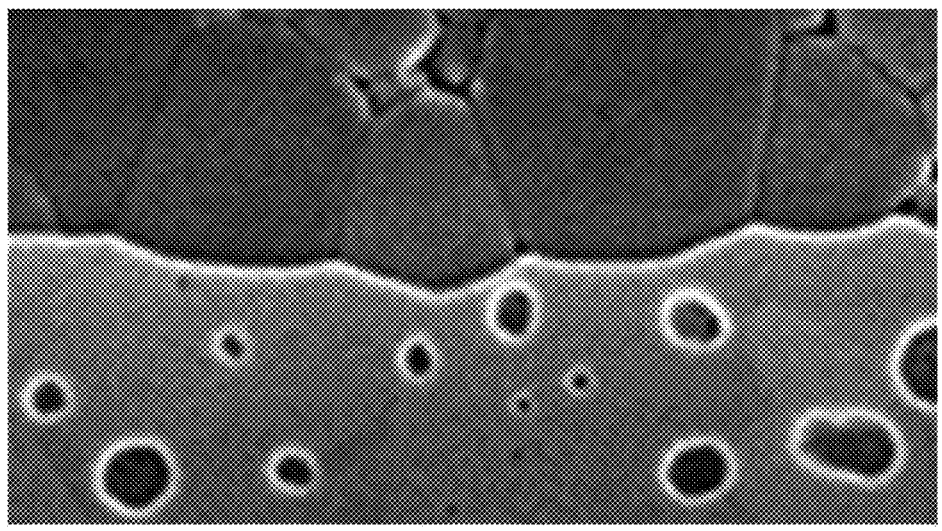
FIG. 14 is an enlarged view of an interface between an internal electrode and a dielectric layer in FIG. 13.

Referring to FIG. 14 in which the interface between the internal electrode and the dielectric layer is enlarged in FIG. 13, it can be confirmed that a composite layer containing Ni and Sn is disposed at the interface between the dielectric layer and the internal electrode, and a common material is trapped at the interface portion of the internal electrode.

For five arbitrary internal electrodes extracted from an image obtained by scanning the cross-section in the first and second directions (length and thickness directions) cut in the central portion of the body in the third direction (width direction) of Inventive example, an area occupied by the ceramic additive in a region (interface portion) to a depth of ⅓ of the thickness of the internal electrode is measured, and each value and the average value thereof are described in Table 1 below.

TABLE 1

| Classifications | Area % of ceramic additive of interface portion |
|---|---|
| 1 | 6.5 |
| 2 | 5.1 |
| 3 | 14.9 |
| 4 | 8.8 |
| 5 | 12.5 |
| Average value | 9.6 |

As can be seen from Table 1, in the case of the Inventive example, the interface portion IP may include 5 to 15 area % of the ceramic additive 23.

For five arbitrary internal electrodes extracted from an image obtained by scanning the cross-section in the first and second directions (length and thickness directions) cut in the central portion of the body in the third direction (width direction), with a scanning electron microscope (SEM), an energy disperse X-ray spectrometer (EDS) line scan analysis was performed along the thickness direction of the internal electrode, and a ratio of Sn concentration in a center of the thickness direction and the Sn concentration in the composite layer (CL) was measured, and each value and an average value thereof are illustrated in Table 2 below.

TABLE 2

| Classifications | Sn concentration of composite layer (CL)/Sn concentration of central portion (CP) |
|---|---|
| 1 | 5.1 |
| 2 | 6.4 |
| 3 | 5.8 |
| 4 | 5.4 |
| 5 | 5.7 |
| Average value | 5.7 |

Referring to Table 2, it can be seen that the Sn concentration of the composite layer CL is 5 times or more higher than the Sn concentration of the central portion CP.

As set forth above, according to an embodiment of the present disclosure, as one of various effects of the present disclosure, reliability of a multilayer electronic component may be improved.

One of the various effects of the present disclosure is to maximize contraction of the internal electrode in a thickness direction and suppress the contraction thereof in length and width directions, thereby making the internal electrode thinner and improving connectivity and smoothness of the internal electrode.

While the exemplary embodiments have been shown and described above, it will be apparent to those skilled in the art that modifications and variations could be made without departing from the scope of the present invention as defined by the appended claims.

What is claimed is:

1. A multilayer electronic component, comprising:
a body including a dielectric layer, and an internal electrode alternately disposed with the dielectric layer; and
an external electrode disposed on the body and connected to the internal electrode,
wherein a composite layer containing Sn and Ni is disposed at an interface between the internal electrode and the dielectric layer,
wherein the internal electrode comprises an interface portion between the composite layer and a central portion of the internal electrode,
wherein a Sn concentration of the composite layer is 5 times or more of a Sn concentration of the central portion,
wherein the internal electrode comprises a ceramic additive.

2. The multilayer electronic component of claim 1, wherein the interface portion is a region from the interface between the composite layer and the internal electrode to a depth of ⅓ of a thickness of the internal electrode.

3. The multilayer electronic component of claim 1, wherein the ceramic additive has 5 to 15 area % of the interface portion.

4. The multilayer electronic component of claim 1, wherein an area % of the ceramic additive in the central portion is ½ or less of an area % of the ceramic additive in the interface portion.

5. The multilayer electronic component of claim 1, wherein the composite layer contains Sn and Ni in a form of $Ni_3Sn$.

6. The multilayer electronic component of claim 1, wherein the ceramic additive includes $BaTiO_3$.

7. The multilayer electronic component of claim 1, wherein the internal electrode contains Ni as a main component.

8. The multilayer electronic component of claim 1, wherein an average thickness of the composite layer is 10 to 30 nm.

9. The multilayer electronic component of claim 1, wherein an average thickness of the internal electrode is 0.41 μm or less.

10. The multilayer electronic component of claim 1, wherein an average thickness of the dielectric layer is 0.41 μm or less.

11. The multilayer electronic component of claim 1, wherein the internal electrode has internal electrode connectivity of 85% or more.

12. A multilayer electronic component, comprising:
a body including a dielectric layer, and an internal electrode alternately disposed with the dielectric layer; and
an external electrode disposed on the body and connected to the internal electrode,
wherein a composite layer containing Sn and Ni is disposed at an interface between the internal electrode and the dielectric layer,
wherein the internal electrode comprises an interface portion between the composite layer and a central portion of the internal electrode,
wherein a Sn concentration of the composite layer is larger than a Sn concentration of the interface portion,
wherein the internal electrode comprises a ceramic additive, and an area % of the ceramic additive in the interface portion is greater than an area % of the ceramic additive in the central portion of the internal electrode.

13. The multilayer electronic component of claim 12, wherein the Sn concentration of the composite layer is larger than a Sn concentration of the central portion of the internal electrode.

14. The multilayer electronic component of claim 12, wherein the area % of the ceramic additive in the central portion is ½ or less of the area % of the ceramic additive in the interface portion.

15. The multilayer electronic component of claim 12, wherein the composite layer contains Sn and Ni in a form of $Ni_3Sn$.

* * * * *